2,856,425

PRODUCTION OF AROMATIC ACID HALIDES

Ralph C. Schreyer, Wilmington, Del., assignor to E. I. du Pont de Nemours and Company, Wilmington, Del., a corporation of Delaware No Drawing. Application April 6, 1956
Serial No. 576,525

12 Claims. (Cl. 260—544)

This invention relates to the preparation of aromatic acid halides, and more particularly to the preparation of aromatic organic acid halides from trihalomethyl-substituted aromatic organic compounds.

The aromatic acid chlorides have many uses in the arts, particularly as intermediates for the preparation of other compounds. The aromatic polybasic acid chlorides, such as terephthaloyl chloride, are of great technical importance in the preparation of condensation polymers containing aromatic groups, such as polyamides or polyesters. The preparation of these aromatic acid chlorides has presented many difficulties. For example, the preparation of the aromatic polybasic chlorides has, in many instances, involved the use of expensive raw materials; it usually being necessary to start with the polybasic acids themselves, which often are difficult to prepare and invariably are resistant to reaction with chlorinating agents, such as phosphorus pentachloride, thionyl chloride or the like.

An object of the present invention is to provide an novel process for the preparation of aromatic organic acid chlorides. Another object of the invention is to provide a metathetical reaction between aromatic trihalomethyl-substituted organic compounds and certain metal oxides resulting in the preparation of the corresponding aromatic organic acid halides and the corresponding metal halide or oxyhalide. A further object of the invention is to provide such a process for the preparation of isophthaloyl chloride and terephthaloyl chloride. Other objects of the invention will appear hereinafter.

The above objects are accomplished according to the present invention by reacting under substantially anhydrous conditions a polyvalent metal oxide selected from the metals of the fourth and fifth groups of the periodic table between atomic numbers 22 and 51 at a temperature above 50° C. and preferably between 150 and 300° C. with an aromatic organic compound having a trihalo-substituted primary carbon atom which is attached to the aromatic ring, thus obtaining a metal halide or oxyhalide of the polyvalent metal and an acid halide of the aromatic organic compound. The reaction may be illustrated as follows:

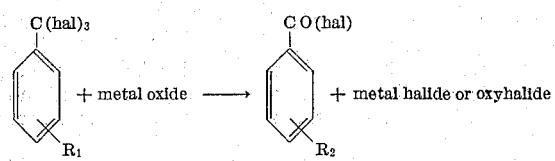

in which $R_1$ may be a hydrogen, a —C(hal)$_3$, or a second aromatic ring which may be condensed with the first ring and may be substituted with a —C(hal)$_3$ group, and $R_2$ has the same meaning except any —C(hal)$_3$ groups in $R_1$ will be converted to —CO(hal) groups in $R_2$.

One aspect of the invention is carried out by heating together a mixture of an aromatic compound substituted with two trichloromethyl groups and either titanium oxide or vanadium pentoxide.

In the preferred embodiment of this invention, a bis(trichloromethyl) benzene corresponding to either m-xylene or p-xylene is mixed with pure titanium dioxide and heated rapidly with good agitation to about 220° C., at which point TiCl$_4$ begins to distill over. Heating is continued at atmospheric pressure and maintained at about 260° C. until all the TiCl$_4$ has been driven over; a vacuum is then applied to the apparatus and the isophthaloyl chloride (or terephthaloyl chloride) is distilled over in a pure form. When this reaction is carried out under the proper conditions, there is very little evolution of HCl gas, there is substantially no evidence of the formation of any decomposition products, and the yields of the acid chloride and the TiCl$_4$ respectively approach a quantitative figure.

The following examples illustrate this invention in detail:

Example I 313 parts (1 mol) of 1,3-bis(trichloromethyl) benzene is added to a suitable reaction vessel, equipped for efficient agitation and provided with a fractionating column, and 82 parts (1.02 mols) of titanium dioxide is then added to the vessel. With good agitation at all times the charge in the vessel is heated rapidly to about 270° C. During this heating period, there is a slight evolution of HCl gas which is bled from the vessel. At about 250° C., TiCl$_4$ begins to distill over indicating that the reaction has begun, and the distillation of TiCl$_4$ becomes quite rapid when the temperature of the charge reaches 270° C. The temperature of the charge is maintained in the range of 260° C. to 270° C. by regulating the amount of TiCl$_4$ drawn off relative to that returned by reflux through the fractionating column. During this operation, it is observed that a yellow crystalline solid forms in the column, and it has been determined that this solid is an unstable complex of TiCl$_4$ with the acid chloride formed in the reaction. However, upon decomposition, this complex produces TiCl$_4$ which has a greater vapor pressure than the complex, and careful operation of the column enables the removal of substantially pure TiCl$_4$ (B. P. 136° C.).

Completion of the reaction is indicated by a marked rise in the temperature of the charge in the reaction vessel and an increase of the vapor temperature in the column. At this point, vacuum is applied to the system, and the resulting isophthaloyl chloride is distilled at a pressure of about 15 mm. Hg and a temperature of about 145° C. (143–147° C.). After a preliminary cut to remove the last traces of TiCl$_4$ the remainder of the isophthaloyl chloride is distilled in a relatively pure form and solidifies to a crystaline solid showing a melting point in the range of 36–40° C. (Literature variously reports 39°, 41°, and 43–44°; the discrepancies probably arise from impurities in the raw materials.) The isophthaloyl chloride in the preliminary cut is recovered either by careful fractionation or, preferably, by returning the cut to the initial charge of a subsequent batch. Over-all yields of a typical charge are about:

TiCl$_4$ _____ 184 parts—95% theory
Isophthaloyl chloride_____ 173 parts—85% theory

Example II

Using the same equipment and amounts of materials as in Example I but starting with 1,4-bis(trichloromethyl) benzene, the reaction is initiated at about 220° C. and the pot temperature is maintained in the range of about 240–270° C. during the removal of the TiCl$_4$. The distillation of the resulting terephthaloyl chloride is carried out at about 142° C. (140–145° C.) under a pressure of 15 mm. Hg to give a relatively pure product which solidifies to a crystalline solid melting in the range of 80–84°

C. (Literature—variously reported between 77–84° C.) The yields are comparable to those in Example I.

*Example III*

A mixture of 12 gm. titanium dioxide and 47 gm. 1,3-bis(trichloromethyl)benzene was refluxed for 15 minutes. The mixture was then distilled directly to give 10 gm. of a light green oil (B. P. 130–136° C.) which fumed on exposure to air. (Cal. for $TiCl_4$: Ti, 25.26; Cl, 74.74; found: Ti, 21.24; Cl, 74.84—$TiCl_4$ boils at 136° C.) Distillation was continued under vacuum to give 31 gm. B. P. $_{4-8\ mm.}$ 120–170° C. This cut was redistilled to give 15 gm. B. P. $_{5\ mm.}$ 120–133° C. (Cut #1) and 10 gm. B. P. $_{5-7\ mm.}$ 133–147° C. (Cut #2). Analysis of these fractions showed (Cut #1) 50.65% Cl and (Cut #2) 57.46% Cl. Calc. for isophthaloyl chloride $C_8H_4Cl_2O_2$: Cl—34.98%, for 1.3 bis(trichloromethyl)benzene $C_8H_4Cl_6$: 68.1% Cl. These data indicate by calculation that Cut #1 is a mixture of about 47% 1,3 bis(trichloromethyl)benzene and 53% isophthaloyl chloride, whereas Cut #2 contains about 68% 1,3 bis(trichloromethyl)benzene and 32% isophthaloyl chloride.

*Example IV*

A charge of 12 gm. titanium dioxide and 47 gm. 1,4-bis(trichloromethyl)benzene was refluxed for 30 minutes. The mixture was cooled to room temperature and 400 cc. ether was added. The ether solution was filtered from unreacted solid (ca. 10.5 g.) and distilled directly. After removal of the ether, about 4 gm. of crude $TiCl_4$ B. P. $_{50-55\ mm.}$ 50–70° C. was obtained (Cut #1). In addition 5 gm. of liquid B. P. $_{3-4\ mm.}$ 135–140° C. was recovered (Cut #2). When a portion of this liquid (Cut #2) was esterified with methanol, a solid material precipitated. After isolation by filtration and drying, this solid melted at 139–141° C. Dimethyl terephthalate is reported to melt at 141–142° C. hence Cut #2 was comprised of terephthaloyl chloride.

*Example V*

313 parts of 1,4-bis(trichloromethyl)benzene and 196 parts of antimony trioxide are charged to the apparatus of Example I and the charge is heated cautiously to about 60° C., whereupon a vigorous reaction takes place which carries the temperature without further heating to about 215–220° C. giving a somewhat dark colored but substantially clear liquid which solidifies on cooling. By careful fractionation under reduced pressure, the resulting antimony trichloride is distilled off (B. P. 111°—20 mm. Hg) leaving the terephthaloyl chloride which is then distilled in a relatively pure form as in Example I.

*Example VI*

A mixture of 18 parts vanadium pentoxide and 30 parts of 1,4-bis(trichloromethyl)benzene in a vessel similar to that of Example I is heated slowly to about 150° C. whereupon a vigorous reaction takes place and 25 parts of a brown liquid distills over with careful control of the fractionating column. The liquid has a boiling point of 125° C. (Literature reports 127–128° for $VOCl_3$.) The residue in the reaction vessel is then distilled under vacuum as in Example II to give relatively pure terephthaloyl chloride.

*Example VII*

42 parts of benzotrichloride and 100 parts of vanadium pentoxide are mixed in a glass vessel equipped with an agitator and a fractionating column. The vessel is heated to about 90° C. where a vigorous reaction starts. While maintaining the temperature at about 100° C., 276 parts of benzotrichloride is added slowly over a period of about 3 hours. The product is then distilled through the fractionating column to give a cut of about 165 parts with a boiling point in the range of 130–145° C. ($VOCl_3$ boils at 127–128° C., $VCl_4$ at 150°.) The residue is then further distilled to give a substantial cut of relatively pure benzoyl chloride (B. P. 197° C.).

*Example VIII*

39 parts of 4,4'-bis(trichloromethyl)biphenyl and 8.2 parts of titanium dioxide are mixed in an agitated reactor and heated rapidly to about 260–270° C. whereupon titanium tetrachloride distills off leaving a residue which is principally diphenyl-4,4'-dicarbonylchloride. After recrystallization from cyclohexane it melts at about 184° C. (Literature reports 184° C.)

*Example IX*

25 parts of 1-trichloromethyl-naphthalene and 4.1 parts of titanium dioxide are mixed in an agitated vessel and the charge is heated rapidly to about 260° C. whereupon the reaction is initiated. $TiCl_4$ is driven off and may be collected by condensation. When the reaction is complete, a liquid is left in the vessel which solidifies below about 20° C. and which can be purified by fractional distillation under reduced pressure. (B. P. about 163° C. at 10 mm. Hg pressure.)

Since this reaction is metathetical, it is preferred to use substantially stoichiometric proportions of the selected metal oxides and of the trichloromethyl compounds. However, the reaction itself is not dependent upon the use of any specific amount of either ingredient, although the optimum yields result from the proper selection of the relative amounts of ingredients. The examples have shown a slight (about 2%) excess of the metal oxide as the preferred amount.

There is only a selected group of metal oxides which give smooth reactions and pure products in the process of this invention. These metals include the elements in the Fourth and Fifth Groups of Mendeleeff's Periodic Table and the fourth and fifth periods in the table and specifically include titanium, vanadium, arsenic, zirconium and antimony. The remaining metals in this group, germanium, niobium and tin are also useful but are less desirable because of either the rarity or the intractable nature of the oxides. These metals give smooth reactions free from excessive violence and evidence of decomposition of the reactants. Furthermore, the reactions proceed at temperatures which are suitable for practical operations. There are many metal oxides which will react with trichloromethyl groups in compounds such as those described herein, but the reactions proceed in many cases with considerable violence and with evidence of by-products, such as tars and the like, resulting in major proportion. Therefore, such other metal oxides are not effective in the preparation of acid chlorides or organic compounds in the manner that is so effectively accomplished by the metal oxides of this invention.

Titanium dioxide is particularly effective for the purposes of this invention because it is readily available in a highly purified form and because the characteristics of the resulting titanium tetrachloride are such as to make it readily distillable from the reaction mixtures, leaving behind substantially pure acid chloride which is then easily purified, by distillation or crystallization from selected solvents. Also especially valuable in this invention is the use of vanadium pentoxide because it gives access to vanadium oxychloride ($VOCl_3$) in a much more satisfactory manner than other processes for the preparation of this compound.

It has been found that the purity of the metal oxides profoundly affects the course of the reaction in question. Thus, titanium oxides which are found in nature are usually mixed with iron oxides, and the use of these materials results in poor yields and gross decomposition. Even some pigment grades of titanium dioxide which contain small amounts of aluminum oxides as treating agents have been unsatisfactory.

This invention is applicable to compounds of an aromatic nature containing at least one trichloromethyl group attached directly to an aromatic ring. The examples have shown compounds containing one trichloromethyl group attached to a benzene ring and to a naphthalene residue. They have also shown two trichloromethyl groups attached to a benzene ring. The meta and para derivatives are the preferred compounds of this invention. The invention is also applicable to naphthalene derivatives having more than one trichloromethyl group. Furthermore, it is applicable to derivatives of biphenyl, anthracene and other aromatic compounds.

Although the working examples have shown the use of trichloromethyl derivatives, the invention is equally applicable to the tribromomethyl derivatives. Thus, this invention can be applied to the reaction of the preferred polyvalent metal oxides with such compounds as benzotrichloride, benzotribromide, 1,3-bis(trichloromethyl) benzene, 1,4-bis(trichloromethyl)benzene, trichloromethyl naphthalenes, bis(trichloromethyl) naphthalenes, tricholoromethyl biphenyl, bis(trichloromethyl) biphenyl, trichloromethyl anthracenes, bis(trichloromethyl)anthracenes and like compounds. Moreover, the presence of other substituents on these benzene rings is possible such as, for instance, halogen, alkyl, and the like. Such groups on the aromatic nucleus do not interfere with this reaction and the resulting acid chlorides will be substituted in a like manner.

In order that the reaction of this invention shall proceed satisfactorily, it is necessary that several conditions be met. In the first place, the reaction system must be substantially anhydrous since water will interfere with the reaction by, in turn, reacting with each of the resulting products. Many of the polyvalent metal chlorides, and titanium tetrachloride in particular, are readily hydrolyzed by water. Likewise, the acid chlorides of organic acids are readily hydrolyzed by water to give the free acid. Hence, the presence of water would be highly detrimental to the desired results. It is also necessary that the conditions be such as to enable the temperature to reach the point at which the reaction is initiated. This temperature will vary, depending upon the combination of reactants used. Thus, in the case of the reaction between the bis(trichloromethyl)benzenes and titanium dioxide, it is necessary to reach the temperature of about 220° C. (260° to 270° C. is the preferred range) to enable the reaction to proceed satisfactorily. Since the boiling point of titanium tetrachloride is very much below this temperature, it should be removed from the reaction mixture to prevent the boiling point of the mixture from becoming so low that the reaction no longer proceeds. On the other hand, if the initiation temperature of the reaction is below the boiling points of either the initial ingredients or the resulting products, the reaction will go readily to completion without removal of the products. The products could then be separated by conventional means. It is also contemplated that pressure be used, as in an autoclave, to enable the desired initiation temperature to be reached.

In general, the reaction proceeds satisfactorily without added solvents if efficient agitation is employed. Under some circumstances, however, it may be desirable to introduce inert liquid solvents to promote contact between the reactants or to retain the final products in a fluid form. For this purpose, there may be used any liquid solvent that is inert to the reactants and the reaction products. The aliphatic hydrocarbon solvents and halognated hydrocarbons such as chloroform, tetrachloroethylene, carbon tetrachloride, dichlorodifluoroethane and the chlorobenzenes are suitable for this purpose. In many cases, the aromatic acid halide produced, may be a suitable medium. This is the case during the latter stages of the reaction procedure which removes metal halide during the reaction.

The invention described provides an easily controllable chemical reaction for preparing aromatic acid halides; especially the chlorides of dibasic acids, such as isophthalic and terephthalic acid, which are used in the preparation of polymer compositions. The acids themselves are obtainable by other methods, and it is possible to prepare the acid chlorides from the respective acids by conventional reactions, but these methods have proved uneconomical and difficult to carry out. The bis(trichloromethyl)benzenes are commercial products as is titanium dioxide, and this invention provides an economical method of using these readily obtainable products to produce these valuable aromatic acid chlorides.

This application is a continuation-in-part of my copending application Serial No. 376,993, filed August 27, 1953 and now abandoned.

I claim:

1. A process for the preparation of aromatic acid halides which comprises heating to reaction temperatures an aromatic compound, containing a trihalomethyl radical attached to the aromatic nucleus, said trihalomethyl radical being selected from the group consisting of trichloromethyl and tribromomethyl and as a second reactant, a metal oxide, the metal of which is selected from the group consisting of the metals of Groups IV and V of Mendeleef's Periodic Table having atomic numbers between 22 and 51 both numbers inclusive, thereby converting the trihalomethyl group to a carbonyl halide group and the metal oxide to a metal compound selected from the group consisting of metal halides and metal oxyhalides.

2. The process of claim 1 in which the trihalomethyl group is a trichloromethyl group.

3. A process for the preparation of terephthaloyl radicals are selected from the group consisting of trichloromethyl and tribromomethyl, and as a second reactant, a metal oxide, the metal of which is selected from the group consisting of the metals of Groups IV and V of Mendeleef's Periodic Table having atomic numbers between 22 and 51 both numbers inclusive, thereby converting the bis(trihalomethyl) benzene to a phthaloyl halide and the metal oxide to a metal compound selected from the group consisting of metal halides and metal oxyhalides.

4. A process for the preparation of terephthaloyl chloride which comprises heating to reaction temperatures 1,4-bis(trichloromethyl) benzene with titanium dioxide thereby forming terephthaloyl chloride and titanium tetrachloride.

5. A process for the preparation of isophthaloyl chloride which comprises heating to reaction temperatures 1,3-bis(trichloromethyl)benzene with titanium dioxide thereby forming isophthaloyl chloride and titanium tetrachloride.

6. A process for the preparation of terephthaloyl chloride which comprises heating to reaction temperatures 1,4-bis(trichloromethyl)benzene with vanadium pentoxide thereby forming terephthaloyl chloride and a mixture of vanadium tetrachloride and vanadium oxychloride.

7. A process for the preparation of isophthaloyl chloride which comprises heating to reaction temperatures 1,3-bis(trichloromethyl)benzene with vanadium pentoxide thereby forming isophthaloyl chloride and a mixture of vanadium tetrachloride and vanadium oxychloride.

8. A process for the preparation of terephthaloyl chloride which comprises heating to reaction temperatures 1,4-bis(trichloromethyl)benzene with antimony trioxide thereby forming terephthaloyl chloride and antimony trichloride.

9. A process for the preparation of isophthaloyl chloride which comprises heating to reaction temperatures 1,3-bis(trichloromethyl)benzene with antimony trioxide thereby forming isophthaloyl chloride and antimony trichloride.

10. A process for the preparation of a phthaloyl chloride which comprises reacting at temperatures ranging from 220–270° C. a bis(trichloromethyl)benzene with titanium dioxide, removing titanium tetrachloride as it forms and recovering the phthaloyl chloride.

11. A process for the preparation of isophthaloyl choride which comprises reacting at temperatures ranging from 220–270° C. 1,3-bis(trichloromethyl)benzene with titanium dioxide, removing titanium tetrachloride as it forms and recovering isophthaloyl chloride.

12. A process for the preparation of terephthaloyl chloride which comprises reacting at temperatures ranging from 220–270° C. 1,4-bis(trichloromethyl)benzene with titanium dioxide removing titanium tetrachloride as it forms and recovering terephthaloyl chloride.

References Cited in the file of this patent

UNITED STATES PATENTS

| | | |
|---|---|---|
| 2,563,820 | Darragh et al. | Aug. 14, 1951 |
| 2,665,307 | Newcomer | Jan. 5, 1954 |

OTHER REFERENCES

Marek, A. C. S. Chem. Eng. Unit Processes Review, p. 1990 (1951).

UNITED STATES PATENT OFFICE
CERTIFICATE OF CORRECTION

Patent No. 2,856,425                                  October 14, 1958

Ralph C. Schreyer

It is hereby certified that error appears in the printed specification of the above numbered patent requiring correction and that the said Letters Patent should read as corrected below.

Column 3, line 51, before "in a" insert the syllable -- tilled --; line 65, for "bonzotrichloride" read -- benzotrichloride --; column 6, line 32, after "terephthaloyl" insert -- halides which comprises heating to reaction temperatures a bis(trihalomethyl) benzene in which its trihalomethyl --.

Signed and sealed this 10th day of February 1959.

(SEAL)
Attest:

KARL H. AXLINE                                          ROBERT C. WATSON
Attesting Officer                                     Commissioner of Patents